(12) United States Patent
Araujo (10) Patent No.: US 6,783,133 B1
(45) Date of Patent: Aug. 31, 2004

(54) CYCLESKI

(76) Inventor: Mario Araujo, 40 Brandy Crescent, Kitchener, Ontario (CA), N2B 3W8

( * ) Notice: Subject to any disclaimer, the term of this patent is extended or adjusted under 35 U.S.C. 154(b) by 0 days.

(21) Appl. No.: 09/689,703

(22) Filed: Oct. 13, 2000

(30) Foreign Application Priority Data

Oct. 15, 1999 (CA) .............................................. 2285892

(51) Int. Cl.[7] .............................................. A63C 17/18
(52) U.S. Cl. ...................................................... 280/7.14
(58) Field of Search .................................. 280/7.1, 7.12, 280/7.14, 7.15, 8, 9, 28, 12.1, 12.11, 12.12, 12.13, 12.14, 13, 28.11

(56) References Cited

U.S. PATENT DOCUMENTS

| | | | | |
|---|---|---|---|---|
| 473,434 | A | * | 4/1892 | Stevens ...................... 280/7.14 |
| 512,690 | A | * | 1/1894 | Firth .......................... 280/7.12 |
| 561,405 | A | * | 6/1896 | Leahan ....................... 280/7.14 |
| 564,306 | A | * | 7/1896 | Dean .......................... 280/7.14 |
| 577,306 | A | * | 2/1897 | Kolbenson .................. 280/7.12 |
| 800,186 | A | * | 9/1905 | Vaughn ....................... 280/7.14 |
| 3,623,563 | A | | 11/1971 | Gostomski |
| 3,814,198 | A | | 6/1974 | Seiler |
| 4,027,891 | A | | 6/1977 | Frame |
| 4,146,101 | A | | 3/1979 | Plourde |
| 4,168,841 | A | | 9/1979 | Uhlyarik |
| 5,102,153 | A | | 4/1992 | Rhode |
| 5,344,167 | A | | 9/1994 | Strouth |
| 5,423,559 | A | | 6/1995 | Rhode |
| 5,474,146 | A | * | 12/1995 | Yoshioka et al. |
| 5,673,772 | A | * | 10/1997 | Martin |
| 6,105,979 | A | * | 8/2000 | Desrochers .................. 280/28 |

FOREIGN PATENT DOCUMENTS

GB        2293581 A     4/1996

* cited by examiner

Primary Examiner—Bryan Fischmann
(74) Attorney, Agent, or Firm—Eugene J. A. Gierczak (57) ABSTRACT

A ski attachment for the front forks of a cycle with an extension having a first and second end, the first end of the extension adapted to be disposed between the forks of the cycle; attachment structure presented by the first end of the attachment member for releasable securement of the attachment member between the forks of the cycle; and a ski pivotally disposed at the second end of the attachment member. The ski attachment also includes a braking mechanism and shock absorbing structure.

6 Claims, 10 Drawing Sheets

CYCLESKI

FIELD OF INVENTION

This invention relates generally to a ski attachment for the front wheel of a cycle and further includes a braking structure and shock absorbing structure.

BACKGROUND ART

The use of bicycles have become a popular sport for recreation and exercise. Such bicycles usually consist of pedal operated bicycles having two wheels, ten speed bicycles or more expensive mountain bikes which are generally light weight and rugged so as to be used on uneven terrain.

Such bicycles are generally used during the spring, summer and fall seasons and are usually put away during the winter when it snows.

Various attempts have heretofore been made in the prior art to try to convert a bicycle to a snow cycle or the like. In particular such prior art devices generally included the removal of the front wheel of a bicycle and the attachment of a ski mechanism to the forks of the front of a bicycle, as well as the rear wheel.

For example, U.S. Pat. No. 4,027,891 teaches a bicycle type ski apparatus for use on snow which employs a bicycle type frame with front and rear wheels removed whereby the frame has bottom front and bottom rear end points. Both the front and rear end points have attached thereto a ski structure.

Another arrangement is disclosed in U.S. Pat. No. 4,168,841 which teaches a conversion system for a pedal operated cycle to provide a pedal operated cycle for use on ice and/or a motor operated cycle for use on snow, both with improved rear wheel apparatus, wherein a regular bicycle can be converted to a vehicle having a forward ski mechanism and a rear wheel and a rearward ski mechanism.

Yet another arrangement is shown in U.S. Pat. No. 5,102,153 which includes both a front ski and rear wheel drive belt assembly.

Finally U.S. Pat. No. 4,146,101 teaches a ski cycle vehicle which includes the body of a bicycle or motorcycle, an endless track and a drive unit which is pivotable and carries the rear portion of the body.

These and other prior art structures describe generally complicated structures whereby both the front and rear wheels include a type of ski structure.

It is an object of this invention to provide a ski attachment for the front forks of a cycle.

It is a further object of this invention to provide an improved ski attachment which is simpler to construct and more reliable than that used in the prior art.

It is a further object of this invention to provide a braking mechanism for said ski attachment.

It is a further object of this invention to provide an improved shock absorbing mechanism for the ski attachment.

It is an aspect of this invention to provide a ski attachment for the front forks of a cycle comprising an extension member having a first and second end, said first end adapted to be disposed between said forks of said cycle; attachment means presented by said first end of said extension member for releasable securement to said extension member between said forks of said cycle; a ski pivotally disposed at said second end of said extension member.

It is yet another aspect of the invention to provide a ski attachment for converting the front wheel within the fork of a bicycle to a ski comprising an extension member having a first end and a second end, said first end adapted for connection to said fork of said bicycle, a clamping means for attaching first end of said extension member to said fork, a ski pivotally connected to said second end of said extension member, braking means associated with said ski and adapted for connection to the braking cable of said bicycle.

It is a further aspect of this invention to provide a ski attachment for attachment to the front fork of a bicycle when the front wheel is removed comprising an extension member having a first and second end, said first end adapted for connection to said forks of said bicycle, clamping means for attaching said front end of said extension member to said fork, a ski having a front end and a back end, said ski pivotally connected to said second end of said extension member, spring means associated with said extension member and said ski for urging said back end of said ski away from said extension member.

These and other objects and features of the invention shall now be described in relation to the following drawings.

DESCRIPTION OF THE INVENTION

In the description which follows, like parts are marked throughout the specification and the drawings with the same respective reference numerals. The drawings are not necessarily to scale and in some instances proportions may have been exaggerated in order to more clearly depict certain features of the invention.

Figure 1:
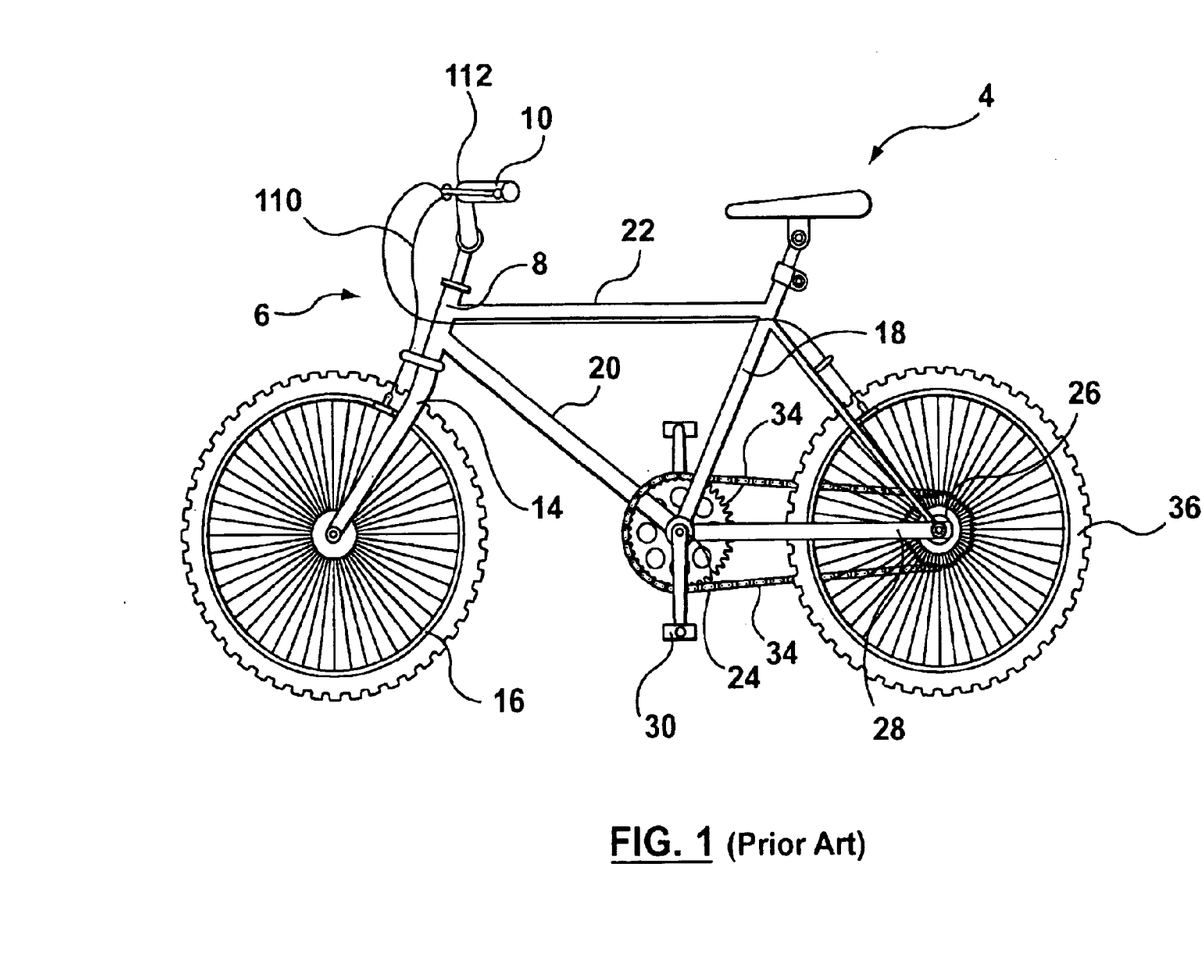
FIG. 1 is a side elevational view of a typical bicycle.
Figure 2:
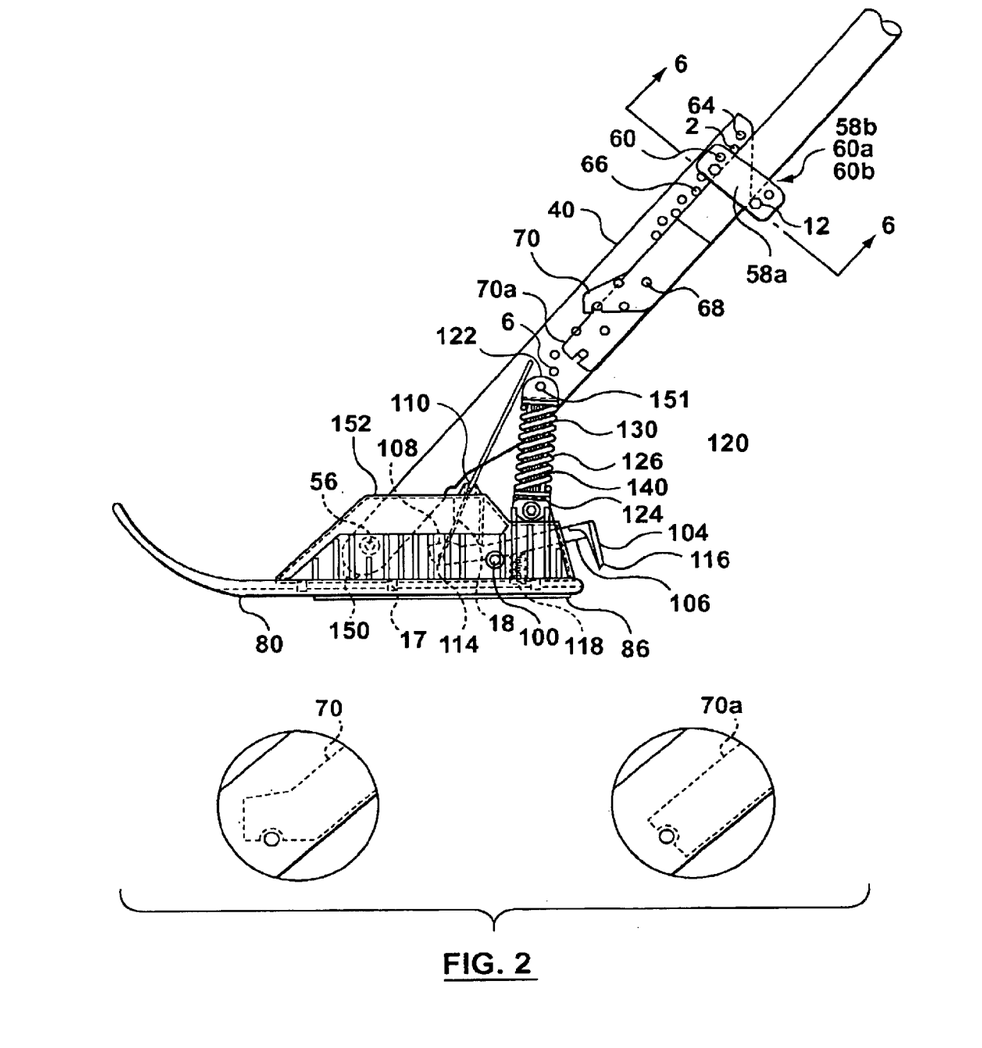
FIG. 2 is a side elevational view of the ski attachment adapted to be attached to the front forks of a bicycle.

The ski attachment is generally illustrated as 2 in FIG. 2. Such ski attachment 2 is adapted to be connected to the front of the bicycle 4 as illustrated in FIG. 1. Although the invention shall be described in relation to a pedal operated cycle the ski attachment should not be limited thereto as it could also be attached to the front of a motorcycle so long as the ski attachment 2 had the appropriate strength characteristics.

The bicycle 4 has a typical bicycle frame 6 in the form of a parallelogram comprised of tubular steel. In particular the bicycle 4 includes a steering support column 8 for receiving steering handles 10 which are operably connected to the front forks 14 which receives the front wheel 16 in a manner well known to those persons skilled in the art.

The bicycle 4 also includes a tubular seat support column 18, a tubular pedal axle support column 20 and a tubular crossbar 22. The crossbar 22 is connected at one end to the steering column 8 and at the other end to the seat support column 18. The axle support column 20 is connected at the upper end to the steering support column 8 and at the lower end to the pedal axle housing 24. The rear axle housing 26 is supported at the rear of the frame 6 by a rear fork 28. The bicycle 4 also includes a pedal crank 30 mounted for rotary motion in the housing 24 to drive a sprocket 32 which rotates the chain 34 to drive rear wheel 36.

In accordance to the invention described herein the front wheel 16 of the bicycle 4 is removed so as to present the forks 14 for attachment to the stem or extension member 40. The extension member 40 is comprised of suitable material such as high tensile aluminum, plastic having the appropriate strength characteristics or metal such as steel or the like.

Figure 3:
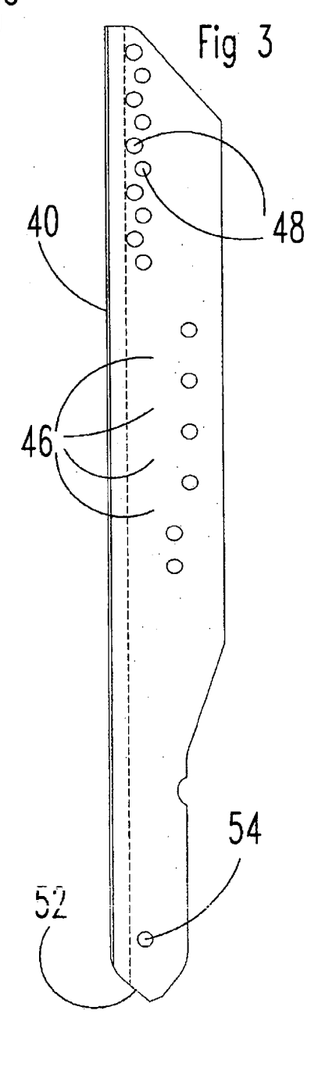
FIG. 3 is a side elevational view of the extension member.
Figures 4, 5:
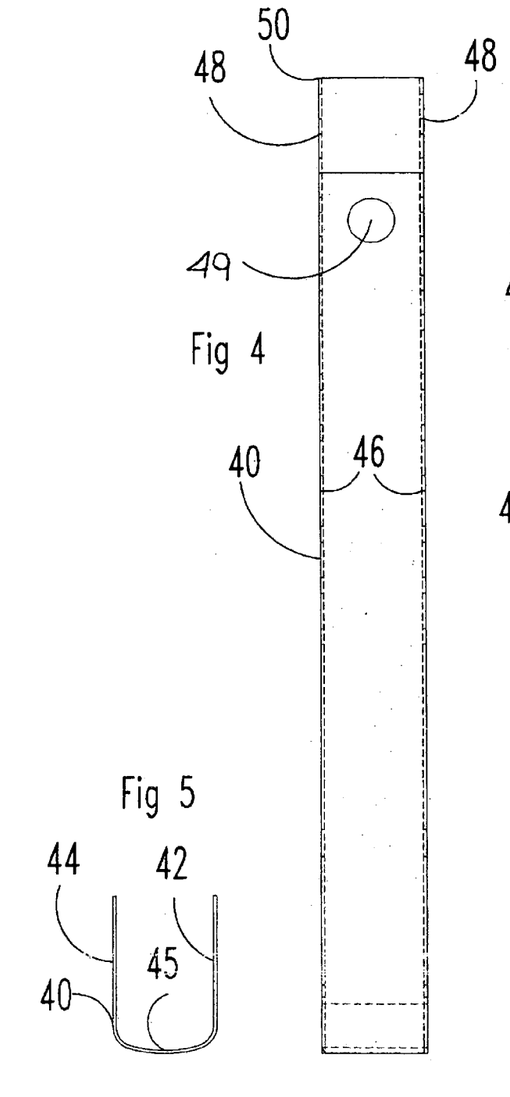
FIG. 4 is a top plan view of the extension member.
FIG. 5 is a cross-sectional view of the extension member.

FIGS. 3, 4 and 5 illustrate generally the extension member 40 which has a U-shaped cross-section. In particular the U-shaped extension member 40 presents two sides 42 and 44 which are connected by connecting member 45. Each of the side 42 and 44 have a plurality of aligned holes 46 as well as a plurality of aligned apertures 48. More specifically the aligned holes define a plurality of fork engaging holes 68.

The extension member 40 presents a first end 50 adapted to be disposed between the forks 14 of the bicycle 4 in a manner to be more fully described herein. The extension member 40 also includes a second end 52 which is pivotally connected to the ski 80. In particular the second end 52 of extension member 40 includes a pivot hole 54 adapted to receive a pin 56 which is received in receiving hole 58 of ski 80.

The numeral 49 is a security lock feed through hole which is adapted to receive a chain and lock to inhibit theft of the cycleski.

Figure 6:
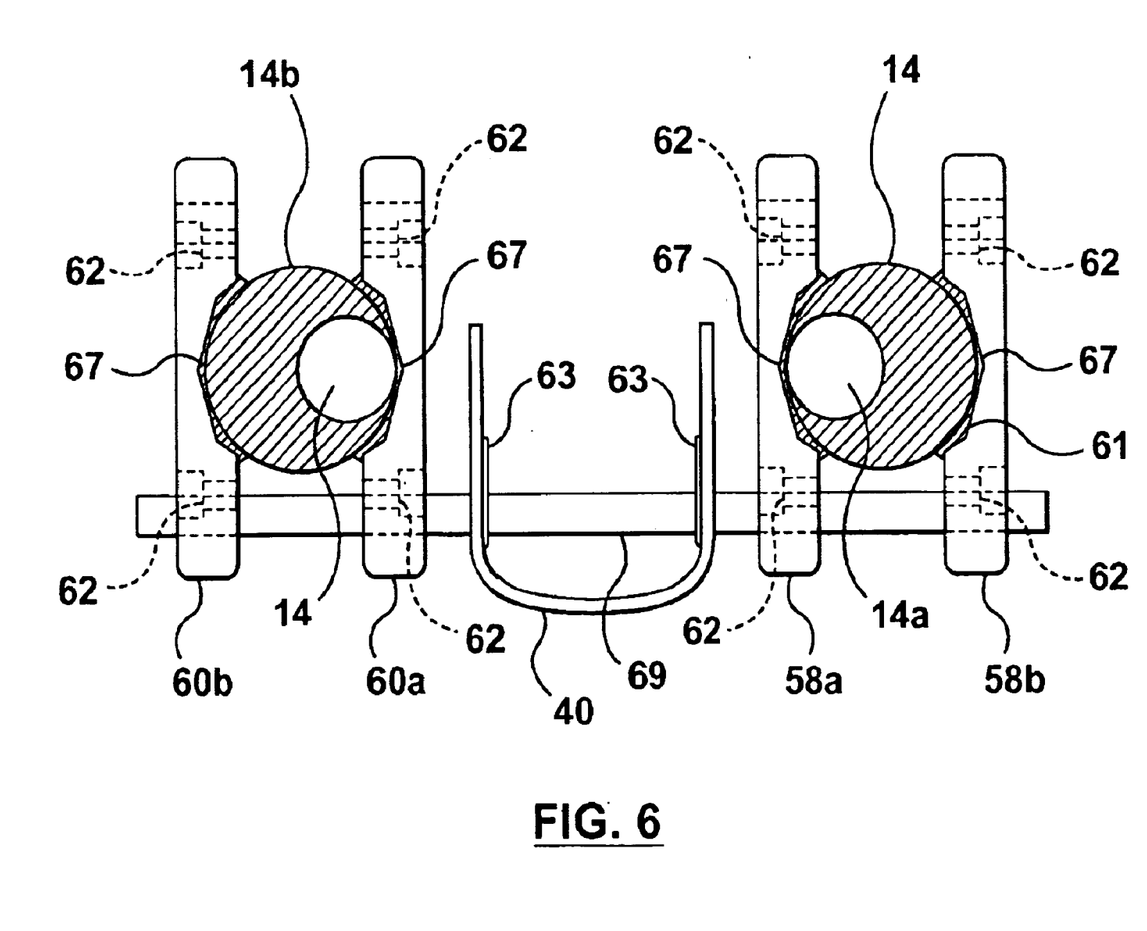
FIG. 6 is a cross-sectional view taken along the lines 6—6 of FIG. 2 showing the extension member and clamping members.

The first end 50 of extension member 40 is adapted to be disposed between the forks 14 as illustrated in FIG. 6. In particular the shape and size of the forks can vary and two such sizes 14a and 14b are shown in FIG. 6.

Figure 7A:
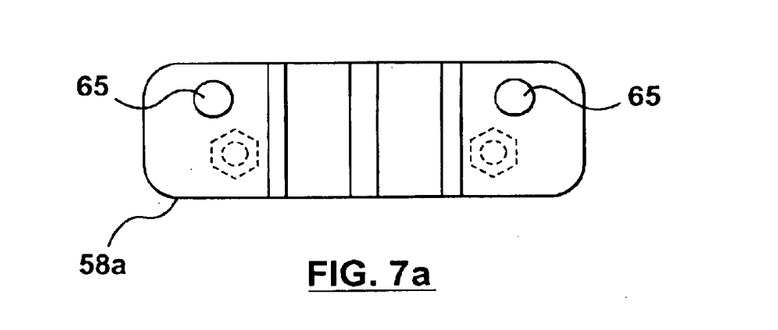
FIGS. 7a, 7b and 7c illustrate the clamping member.
Figure 7B:
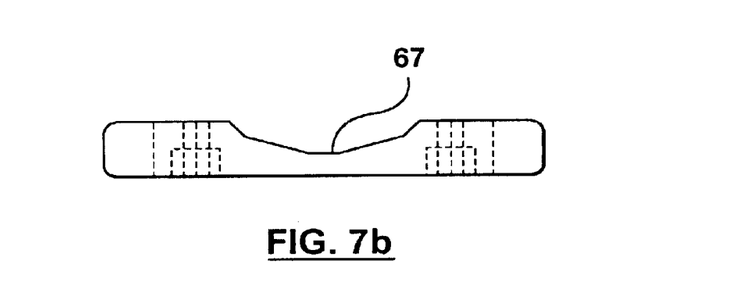
Figure 7C:
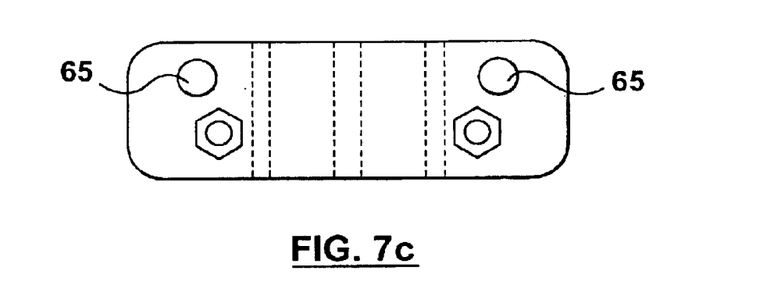
Figure 8:
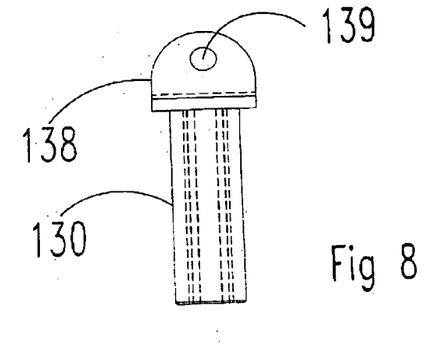
FIG. 8 is a side elevational view of the first connecting member of the spring means.
Figures 9, 11:
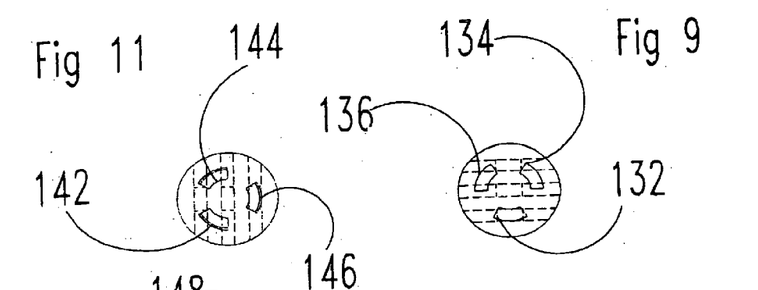
FIG. 9 is an end view of FIG. 8.
FIG. 11 is a top view of FIG. 10.
Figure 10:
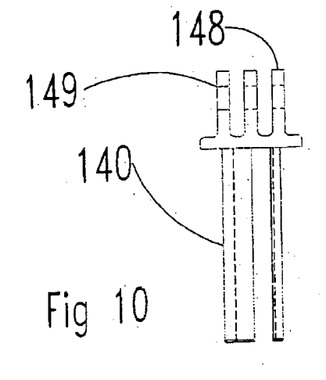
FIG. 10 is a side elevational view of the second connecting member.

One end 50 of extension member 40 has associated therewith a pair of clamping means such as clamping members 58a, 58b and 60a, 60b. One of such clamping members 58a is shown in FIGS. 7a, 7b and 7c; and as will be apparent from FIG. 6 clamping members 58b, 60a and 60b are similarly configured. In particular the clamping members 58a, 58b, 60a, 60b include a fork receiving recess 67 and include pin receiving holes 65 which are adapted to receive a pin 69 as best shown in FIG. 6. Clamping members 58a, 58b are adapted to embrace one of the fork members 14 within the fork receiving recess 67 while the other clamping members 60a, 60b is adapted to embrace the other fork member 14 within the fork receiving recess 67. This allows one to use clamping members which can accommodate different sizes or diameters of forks 14a or 14b. Thereafter appropriate fasteners are threadably secured to the fastening holes 62.

The pin 69 is adapted to also extend through a plurality of pin receiving holes 65 while the fasteners (not shown) are adapted to be received by the fastening holes 62. The numeral 63 represents a retaining clip such as an outer C-clip which is adapted to spring into a groove on the pin 69 so as to keep the pin 69 centered relative to the U-shaped extension member. The other fasteners (not shown) is used to clamp the clamping means to the forks 14. The aligned apertures 48 define two series of a plurality of holes 64, 66. One series of apertures 64 is adapted to receive the pins 69 while the second series of apertures 66 are adapted to receive the fasteners. Accordingly this minimizes the possibility of the clamping means from rotating relative the extension member 40. Furthermore the plurality of holes 64, 66 are utilized as the clamping members 58a, 58b, 60a, 60b, can be moved closer towards the ski or further away from the ski depending on the length and size of the forks 14. This then permits one to utilize substantially one size of ski attachment or extension member 40 for a plurality of different sizes of bicycles whether a 20 inch, 24 inch, 26 inch or 28 inch wheel rim size.

Optionally the extension member 40 can include a plurality of fork engaging holes 68 whereby the end of the fork 70 shown in hidden lines in FIG. 2 can be further secured by means of attaching a fastener through the holes 68 securing the fork thereto. In particular the numeral 70 illustrates the bicycle fork offset mounting style, while number 70a illustrates a bicycle inline mounting style.

The numeral 61 is a rubber strip or the like to protect the finish of the existing fork.

Figure 12:
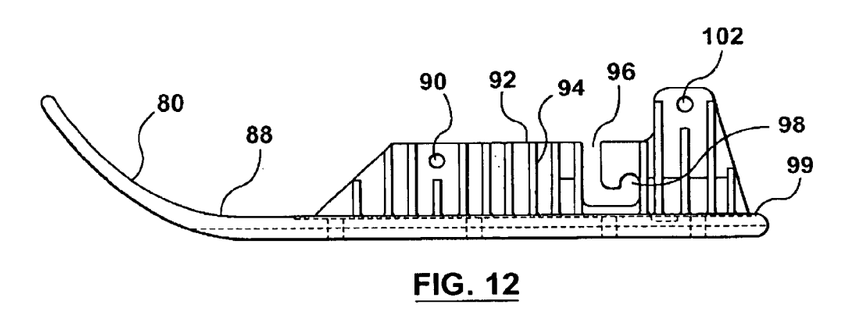
FIG. 12 is a side elevational view of the ski.
Figure 13:
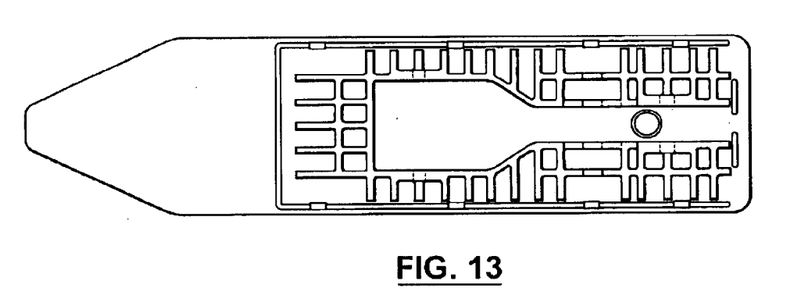
FIG. 13 is a top plan view of the ski.
Figure 14:
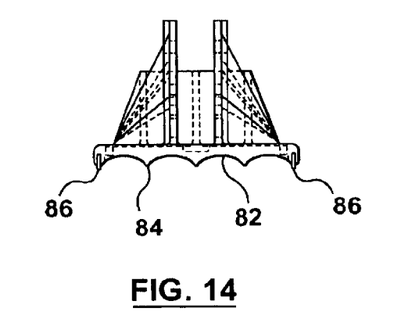
FIG. 14 is an end view of the ski.

The ski 80 is comprised of suitable material such as plastic or the like and is best illustrated in FIGS. 12, 13 and 14. In particular the ski 80 has a bottom surface 82 adapted to contact the snow or ice. Bottom surface 82 can either be flat or as shown in FIG. 14 includes a plurality of ridges 84 to bite into the surface of the snow or ice. Furthermore the bottom surface 82 can include metal edges 86 to further bite into the snow and/or ice. Such edges are commonly used for skis and snowboards. Furthermore the cycleski described herein can be used for skiing on sand.

The top surface 88 of ski 80 includes an upstanding wall 92 having appropriately formed rigidifying extensions 94. The upstanding wall 92 presents hole 90 as well as a brake receiving slot 96 which terminates in a curved portion 98 adapted to receive a brake pin 100 to be more fully described herein. The upstanding wall 92 also includes a hole 102.

Figure 15:
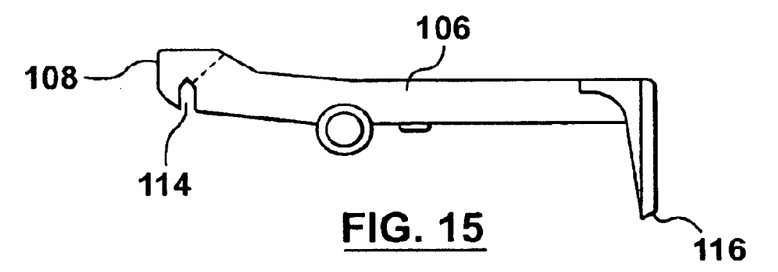
FIG. 15 is a side elevational view of the brake.
Figure 16:
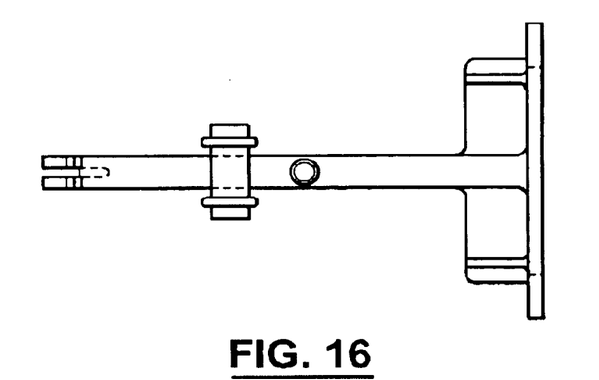
FIG. 16 is a top plan view of FIG. 15.
Figure 17:
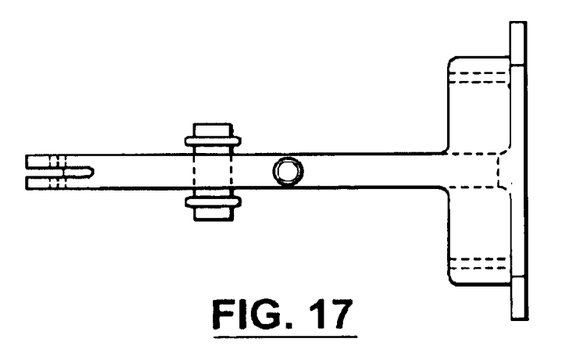
FIG. 17 is a bottom view of FIG. 15.
Figure 18:
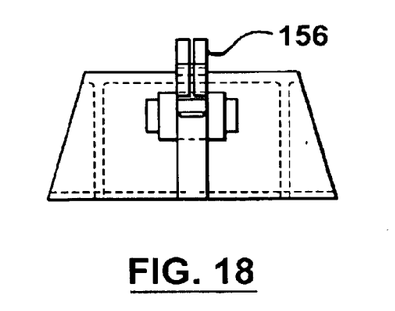
FIG. 18 is an end view of FIG. 20.
Figure 19:
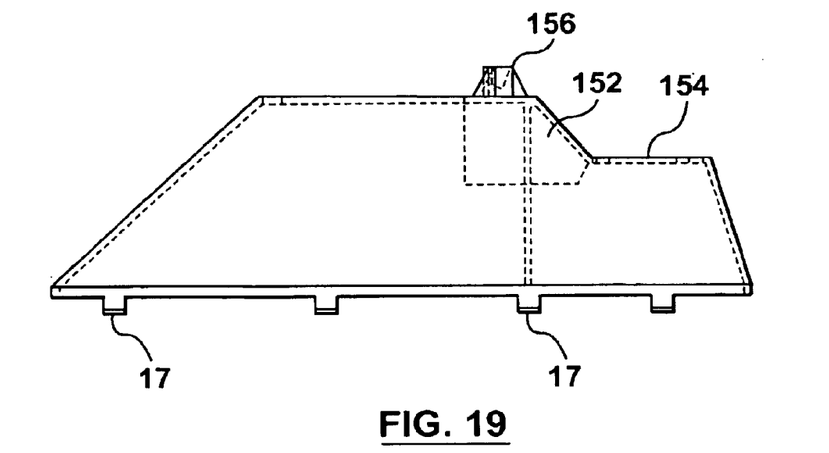
FIG. 19 is a side elevational view of the cover.
Figure 20:
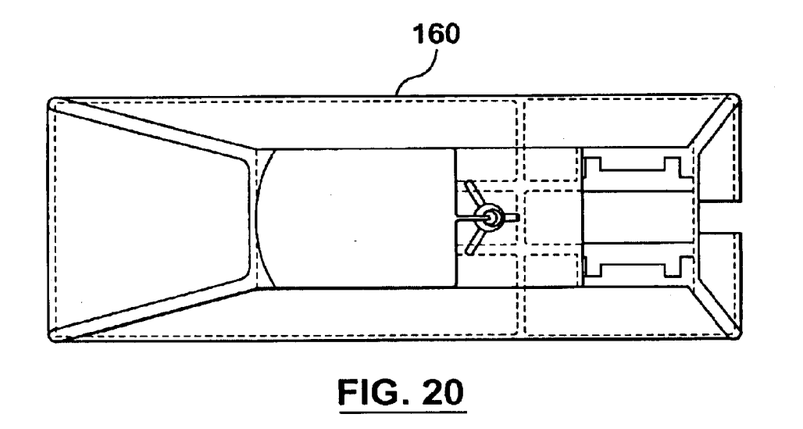
FIG. 20 is a top plan view of the cover.
Figure 21:
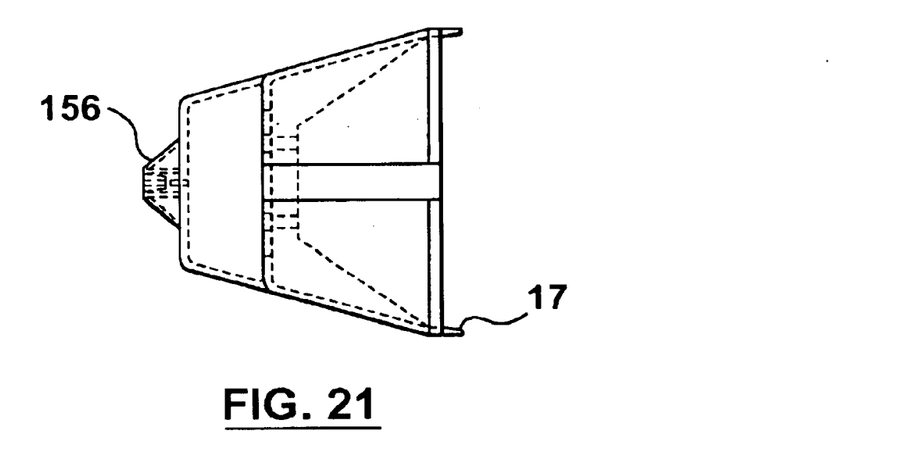
FIG. 21 is another end view of FIG. 20.
Figure 22:
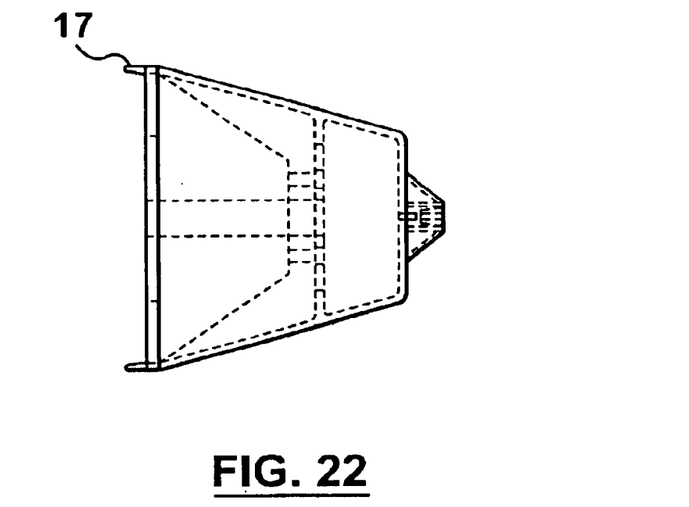
FIG. 22 is the other end view of FIG. 20.

The braking means 104 includes a braking arm 106 having one end 108 adapted for connection to the cable 110 which extends up toward the steering handles 10.

In particular when the front wheel 16 is removed from the bicycle the brake mechanism for the front wheel is adapted such that the front brake cable 110 of the bicycle either extends down toward the braking means or is removed and a new cable 110 which is sufficiently long enough to extend between the brake handle 112 and the cable receiving slot 114 of brake arm 106. The other end of the brake arm 106 includes a snow engaging member 116 which is adapted to pivot downwardly about pin 100 when the brake handle 112 is activated so as to activate the cable 110. In particular when the cable 110 is activated the cable pulls upwardly about one end 108 of brake arm 106 causing the other end of the snow engaging member 116 to pivot downwardly and bite into the snow so as to brake or stop the ski from sliding relative the snow or ice. The braking means 104 also includes means 118 for urging said snow engaging member 116 away from the snow. In other words as shown in FIG. 2 the urging means can comprise of a spring 118 which pushes the snow engaging member 116 up in a counterclockwise direction as shown in FIG. 2 so as to bias the brake in a disengaged position.

The ski attachment 2 also includes spring means 120 which has one end 122 connected to the extension member 40 and another end 124 connected to the ski.

The components of the spring means 120 include a coiled spring 126 and a first connecting member 130 and second connecting member 140 which are slideable relative each other and disposed within the coiled spring 126. In particular the first connecting member 130 includes three fingers 132, 134, 136 which are disposed generally equally around a circle; while second connecting member 140 also includes three fingers 142, 144, 146 disposed generally equally around a circle such that the fingers 132, 134, 136 mesh with fingers 142, 144, 146 for slideable relative movement therebetween within the coiled spring 126. Each of the first connecting members 130 and second connecting members 140 include a clevis like structure 138, 148 having a connecting hole therethrough 139, 149 respectively. The first connecting member 130 is adapted to be disposed between the sides 42, 44 of U-shaped extension member. The extension member 40 includes at least two spring attachment holes 151 which are adapted to receive a connecting pin therethrough which registers with the hole 139 of first connecting member 130. The connecting hole 149 of second connecting member 40 is adapted to be aligned with hole 102 of ski 80 for connection therewith. The spring 126 is preloaded so as to cause the back end 99 of the ski 80 to be urged away from the extension member 40. In other words the size of the spring 126 can be selected so as to cause the first and second connecting members to slide away relative to one another thereby causing the back end 99 of ski 80 to rotate clockwise as shown in FIG. 2. The second end of extension member 40 includes a stop edge 150 which is designed to contact the top surface 88 of ski 80 when the back end 99 of ski 80 reaches a preselected position. In other words when the angle between the bottom surface 82 of ski 80 and the connecting member 40 hits a preselected angle the stop edge 150 contacts the top surface 88 of ski 80 and prevents any further rotation therebetween. Such action minimizes the possibility of the spring action of coil spring 120 from spreading the first connecting member 130 and second connecting member 140 apart.

The size of the spring 126 can be preselected so as to create a preloaded force of for example 30 pounds when a person is seated on the cycle. Such spring action tends to bring down the rear or back portion 99 of ski down towards the snow for a more genuine ride. Furthermore the spring means 126 acts as a shock absorber to provide a more comfortable ride with more control.

A cover 160 as shown in FIGS. 18, 19, 20 and 21 can be utilized to snap over the ski 80. The cover 160 includes tab 17 to snap into the ski 80 at 17. The cover 160 includes appropriate openings 152 for the extension member 40 as well as an opening 154 for the spring means 120. Furthermore an opening 156 is provided for the cable 110. The cover tends to minimize the possibility of snow entering inside the cover which may impede the braking action or smooth pivoting of the various members.

In operation the front wheel 16 of the cycle 4 is removed and the ski attachment attached to the front forks 14 as described above. An appropriate brake cable 110 is connected to the ski attachment 2 and the user is then ready to use the cycleski as described therein by seating themselves on the bicycle and pedalling the crank pedals 30 thereby causing the rear wheel to rotate and bite into the snow. It will be apparent that the cycleski will operate effectively and efficiently with good treads on the rear wheel 36 which will bite into the snow and ice by moving pedal crank 30. The cycleski may be manipulated in a fashion similar to that of a bicycle by moving handles 10 which will cause the fork 14 and ski 80 to move in a desirable direction. When uneven terrain in the snow or ice is encountered the spring means 120 will operate as a shock absorber providing for a smoother ride. As shown in FIG. 2 the first connecting member 130 is attached to the lower hole 151 of extension member 40. Some people may require a softer ride and this can be accomplished by connecting the hole 139 of first connecting member 130 with hole 150a since this will cause the spring 126 to stretch more than as shown in FIG. 2 thereby providing for a smaller preloaded force.

If the user desires to stop, the cable 110 may be activated causing the snow engaging member to bite into the snow and stop the cycleski.

The ski attachment 2 is ideal for use with the cycleski shown herein in cross country skiing terrain or downhill ski terrain provided that the pitch or slope of the hill is sufficiently gentle so as to permit proper traction of the rear wheel 36 into the snow or ice.

Although the preferred embodiment as well as the operation and use have been specifically described in relation to the drawings, it should be understood that variations in the preferred embodiment could be achieved by a person skilled in the trade without departing from the spirit of the invention as claimed herein.

I claim:

1. A ski attachment for the front forks of a cycle comprising:
    (a) an extension member having a first and second end, said first end adapted to be disposed between said forks of said cycle;
    (b) attachment means presented by said first end of said extension member for releasable securement to said extension member between said forks of said cycle;
    (c) a ski pivotally disposed at said second end of said extension member, said ski presenting a front and back end and said ski pivotally connected to said extension member between said front and back end of said ski;
    (d) said second end of said extension member including an edge adapted to contact said ski so as to stop said ski from pivoting when said ski reaches a preselected position;
    (e) a coiled spring, wherein said coiled spring is carried by first and second connecting members slideable relative each other and disposed within said coiled spring, said first connecting member having one end connected to said extension member between said first and second ends of said extension member, said second connecting member connected to said ski between said pivotal connection to said extension member and said back end of said ski.

2. A ski attachment as claimed in claim 1 wherein said extension member has a U-shaped cross-section.

3. A ski attachment as claimed in claim 2 wherein said first connecting member is disposed within said U-shaped extension member.

4. A ski attachment for attachment to the front fork of a bicycle when the front wheel is removed comprising:
    (a) an extension member having a substantially U-shaped cross-section and a first and second end, said first end including a plurality of apertures and adapted for connection to said fork of said bicycle;

(b) clamping means for attaching said first end of said extension member to said fork, said clamping means connectable to said fork and to at least one of said apertures;

(c) a ski having a front end and a back end, said ski pivotally connected to said second end of said extension member;

(d) a spring associated with said extension member and said ski for urging said back end of said ski away from said extension member, said second end of said extension member including a stop for contacting said ski for stopping pivotal rotation of said ski at a preselected position.

5. A ski attachment as claimed in claim 4 wherein said second end of the extension member includes a plurality of holes and said spring is adapted for connection to one of said holes so as to select the tension of said spring.

6. A ski attachment as claimed in claim 5 including a plurality of aligned holes disposed between said first and second ends of said extension member, said aligned holes adapted for connection to the end of said fork.

* * * * *